United States Patent [19]
Rao et al.

[11] 3,861,397
[45] Jan. 21, 1975

[54] IMPLANTABLE FUEL CELL

[75] Inventors: Raghavendra Rao; Gerhard Richter, both of Erlangen, Germany

[73] Assignee: Siemens Aktiengesellschaft, Erlangen, Germany

[22] Filed: Dec. 4, 1972

[21] Appl. No.: 311,956

[30]   Foreign Application Priority Data
   Jan. 3, 1972   Germany............................ 2200054

[52] U.S. Cl. ........ 128/419 B, 128/419 PS, 128/86 F
[51] Int. Cl. ................................................ A61n 1/00
[58] Field of Search ............ 128/419 R, 419 B, 1 R; 136/86 F, 86 DD, 86 D, 86 R, 86 E

[56]   References Cited
   UNITED STATES PATENTS
   3,368,922   2/1968   Salyer ............................... 136/86 F
   3,595,698   7/1971   Kordesch .......................... 136/86 F OTHER PUBLICATIONS
Wolfson Jr. et al., "Transactions of the American Society of Artificial Internal Organs," Vol. XVI, 1970, pp. 193–198.
Drake et al., "Transactions of the American Society of Artificial Internal Organs," Vol. XVI, 1970, pp. 199–205.
Schaldach et al., "Transactions of the American Society of Artificial Internal Organs," Vol. XVI, 1970, pp. 184–192.

*Primary Examiner*—William E. Kamm
*Attorney, Agent, or Firm*—Richards & Geier

[57]   ABSTRACT

An implantable fuel cell is used particularly for the operation of heart beat actuators, artificial hearts or the like. As its operating means are used an oxydisable body substance, preferably glucose, as well as oxygen from the body fluids. The fuel cell is particularly characterized in that a cell fuel electrode as well as one or several selective oxygen electrodes are spatially so arranged with respect to each other that the operational mixture diffused in operational condition from the body liquid into the cell, is guided substantially initially to the corresponding oxygen electrodes and thereupon to the fuel electrode.

6 Claims, 3 Drawing Figures

IMPLANTABLE FUEL CELL

This invention relates to an implantable fuel cell, particularly for the operation of heart beat actuators, artificial hearts or the like, wherein as operating means are used an oxydisable body substance, preferably glucose, as well as oxygen from the body fluids.

The operation of such fuel cells presents certain difficulties. The reason for these difficulties is that the fuel, for example, glucose as well as the other operational substance, namely oxygen, are always present in a mixture in the body fluids. There are catalysts known, for example, carbon, which can selectively react oxygen in the presence of fuels. However, electrodes with which fuels can selectively react in the presence of oxygen, are not known. The simultaneous reaction of fuel and oxygen at the fuel electrode produces a chemical short circuit which after a relatively short time causes a substantial diminution of output and a drop in efficiency.

An object of the present invention is to improve existing constructions.

Another object is to provide fuel cells of the described type wherein a chemical short circuit substantially cannot take place and which for that reason have a higher output and better efficiency.

Other objects of the present invention will become apparent in the course of the following specification.

In the accomplishment of the objectives of the present invention it was found desirable to arrange the cell fuel electrode as well as one or several selective oxygen electrodes spatially with respect to each other in such manner that the operational mixture diffusing under operational conditions from the body fluids into the cell, is guided primarily to the corresponding oxygen electrode and thereupon to the fuel electrode.

In accordance with the present invention oxygen is initially removed at the oxygen electrode from the operational mixture diffused into the cell. Fuel reaching the initially unselective fuel electrode is then substantially free from oxygen, so that there is no essential danger of a chemical short circuit.

In order to remove oxygen the operating mixture diffused into the cell can be channelled through the specific oxygen electrode placed in the path of diffusion. However, better results are produced when the fuel electrode is materially protected from the direct contact of the body fluids by shielding or screening with one or several selective oxygen electrodes permeable to fuel. In case of such "porous" electrodes there is the best possible removal of oxygen.

A sufficiently good protection is assured by using a flat fuel electrode with a comparatively large area having one of its surfaces or sides covered by an oxygen electrode permeable to fuel and another surface or side having a covering, for example, of plexiglass, which does not permit the operational mixture to penetrate. In addition, the output of the cell can be increased when the two surfaces or both sides of the electrode are screend on either side by a selective oxygen electrode permeable to fuel. The distance between the fuel electrode and the corresponding oxygen electrode should be in the $\mu$m range, preferably selected to be 20 $\mu$m.

The electrodes are separated from each other as well as from the body fluids by means of hydrophilic materials which are not permeable to proteinous matter, blood corpuscles, etc. The electrodes are preferably embedded into the hydrophilic material.

As hydrophilic material can be used cellulose or cross-linked polyvinyl alcohol. However, the material consists preferably of a weak acid, negatively charged ion exchanger, for example, a methacrylic acid cation exchanger. Such an ion exchanger prevents due to its great buffer capacity (preferably in the range between pH5 and pH8) an excessive shifting of the pH value in the vicinity of the electrodes and thus avoids a polarization of electrodes which is unsatisfactory for the efficiency of the cell. A negatively charged ion exchanger prevents at the same time the transfer of negatively charged particles of the body fluids, as for example, proteinous matter and blood corpuscles, to the electrodes, thereby avoiding the poisoning of the electrodes. Furthermore, the danger of coagulation of blood corpuscles at the electrodes or the separating interfaces is effectively avoided.

The invention is classified better from the following detailed description when taken in connection with the accompanying drawing showing by way of example only, preferred embodiments of the inventive idea.

Figure 1:
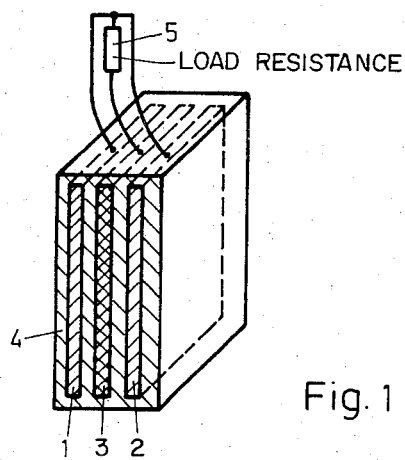
FIG. 1 is a perspective view partly in section of a cell of the present invention.

In the embodiment of the present invention shown in FIG. 1 the fuel cell consists of two flat selective oxygen electrodes 1 and 2 extending parallel to each other, as well as a flat fuel electrode 3 located between the oxygen electrodes.

The oxygen electrodes 1 and 2 transport fuel (glucose). They consist of catalyst-like carbon, bonded and supported on a silver screen. The silver screen has a wire thickness of about 0.04 mm and about 1000 meshes per $cm^2$. The entire thickness of each oxygen electrode 1 or 2 is about 0.04 to 0.1 mm; the surface of the electrodes amounts to 6.3 $cm^2$.

The fuel electrode 3 is a platinum black powder catalyst uniformly deposited on or bonded to a platinum screen. A screen having a thickness of about 0.1 mm to 0.2 mm is used. The surface of the fuel electrode amounts also to 6.3 $cm^2$.

The electrodes 1, 2 and 3 are embedded in an ion exchanger 4, preferably a cation exchanger. More effectively, the ion exchanger is brought in contact with each electrode in liquid form (for example, by dissolving with the catalysts and a pure and unlinked copolymeric exchanger in an organic solvent) to enable a homogeneous mixing of the exchanger with catalysts and to compactly fill the micropore system of the catalyst with the exchanger.

Another possibility consists in a subsequent cross-linking of polyelectrolytes, for instance by formation of ester compounds, as, for example, in cross-linking polyacrylic acid with glycerin or polyvinyl alcohol, or by cross-linking phenol sulfonic acid with formaldehyde or polyethylene imine with epichlor hydrine, or by a covalent bonding, for example, of methacrylic acid with divinyl benzol.

The electrodes 1 to 3 can be connected to a load resistance 5 in deriving energy from the cell under the conditions of operation. In actual practice the energy can be used, for example, for operating a heart beat actuator or an artificial heart.

Figures 2, 3:
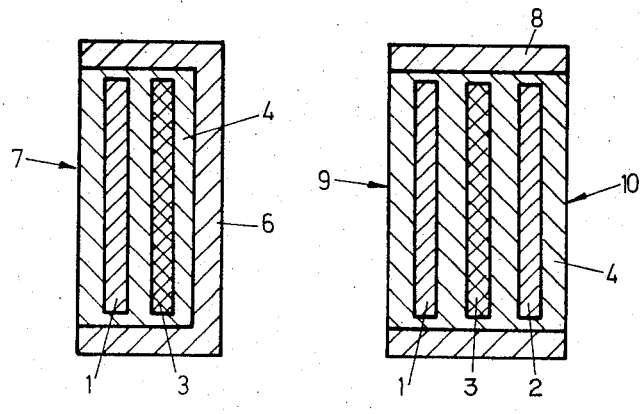
FIG. 2 is a longitudinal section through a different embodiment.
FIG. 3 is a longitudinal section through yet another embodiment.

FIG. 2 shows in longitudinal section a further embodiment of the cell of the present invention having a single selective but fuel-permeable oxygen electrode 1 and a fuel electrode 3 again embedded in a cation exchanger 4. The electrodes are located in a casing 6 of plexiglass having a supply opening 7 for the fuel mixture, whereby the oxygen electrode 1 covers the fuel electrode 3 towards the supply opening.

The embodiment shown in longitudinal section in FIG. 3 has electrodes 1, 2 and 3 which correspond to those of FIG. 1 and which are located in a casing 8 of plexiglass. The casing 8 ha supply openings 9 and 10 at the sides of oxygen electrodes 1 and 2 for the operational mixture.

The embodiments of FIGS. 1, 2 and 3 are operated as follows:

A cell shown in FIGS. 1, 2 or 3 is implanted in a suitable location in the body of a patient.

In the operative condition the operative mixture (glucose and oxygen in dissolved condition) diffuses into the cell. This takes place in the embodiment of FIG. 1 from all sides, in the embodiment of FIG. 2 only through the supply opening 7 and in the embodiment of FIG. 3 through the opening 9 as well as through the opening 10.

Due to the specific spatial arrangement of the individual electrodes the operational mixture reaches first essentially the oxygen electrodes wherein oxygen is reacted and thus removed from the mixture. Thenceforth, practically only the fuel, namely, glucose, reaches the fuel electrode 3. A chemical short circuit is eliminated in this manner.

Experiments which have been accordingly carried out in practice have shown that with cells of the embodiments of the present invention shown in FIGS. 1, 2 and 3 cell voltages having a magnitude of at least 0.4 V are readily attainable. With a measured current of 200 to 250 $\mu$A an output of 80 to 100 $\mu$ Watt is produced. Long-term experiments have shown that this output can be kept constant for a long time period. The output of 80 to 100 $\mu$ W is even sufficient to operate a heart beat actuator. If greater outputs are required, for example, for operating artificial hearts, several cells must be used.

What is claimed is:

1. An implantable fuel cell, particularly for operating heart beat actuators, artificial hearts and the like, said cell in operational condition utilizing an oxidizable body substance, preferably glucose as fuel, and oxygen from the body fluids, said cell comprising an enclosure impermeable to body fluids, a fuel electrode means, at least one porous oxygen electrode means selectively reacting oxygen in the presence of fuel, said electrode means located in said enclosure and including associated electrical connection means for deriving electrical energy from the cell under the condition of operation, hydrophilic means which are non-permeable to proteinous substance, blood corpuscles, etc., spacing said electrode means from each other and said enclosure and means in said enclosure for guiding the diffusing operational mixture of fuel and oxygen first to said selective oxygen electrode means and there through to said fuel electrode means.

2. A fuel cell in accordance with claim 1, wherein said oxygen electrode means is between said fuel electrode and said guiding means.

3. A fuel cell in accordance with claim 2, said fuel electrode means being substantially large and flat and having a surface facing said at least one selective oxygen electrode means permeable to fuel, the other surface of said fuel electrode means facing said enclosure, said enclosure comprising a cover of a material being impenetrable to the operational mixture of fuel and oxygen and consisting, for example, of plexiglass.

4. A fuel cell in accordance with claim 2, said at least one oxygen electrode mean comprising two selective oxygen electrode means permeable to fuel, said fuel electrode means being substantially large and flat and having both surfaces facing said oxygen electrode means.

5. A fuel cell in accordance with claim 2, said enclosure comprising a cell casing containing said electrode means, said casing itself, for example, of plexiglass, being impenetrable to the operational mixture of fuel and oxygen said guiding means comprising at least one opening for the operational mixture, said oxygen electrode means being located in the interior of said casing between said opening and said fuel electrode means so that said oxygen electrode means shields said fuel electrode means from said opening of said casing.

6. A fuel cell in accordance with claim 1, wherein said fuel electrode means consists of a platinum screen and platinum black as catalyst deposited on said platinum screen, and wherein said selective oxygen electrode means is a noble metal screen, such as gold or silver, and an activated carbon caralyst bonded and supported on said noble metal screen, and wherein said hydrophilic material is a weak acid cation exchanger, for example, a methacrylic acid ion exchanger, having a buffer capacity ranging between pH5 and pH8, said cation exchanger surrounding said fuel electrode means and oxygen electrode means.

* * * * *